(12) United States Patent
Bloomfield et al.

(10) Patent No.: US 6,539,400 B1
(45) Date of Patent: Mar. 25, 2003

(54) INFORMATION GATHERING AND PERSONALIZATION TECHNIQUES

(75) Inventors: Mark E. Bloomfield, London (GB); Tanya Cheyne, London (GB)

(73) Assignee: NCR Corporation, Dayton, OH (US)

( * ) Notice: Subject to any disclaimer, the term of this patent is extended or adjusted under 35 U.S.C. 154(b) by 268 days.

(21) Appl. No.: 09/666,658

(22) Filed: Sep. 20, 2000

(30) Foreign Application Priority Data

| Sep. 20, 1999 | (GB) | 9922218 |
| Sep. 20, 1999 | (GB) | 9922219 |
| Sep. 20, 1999 | (GB) | 9922220 |

(51) Int. Cl.[7] .................................. G06F 7/00
(52) U.S. Cl. .................. 707/104.1; 446/26; 463/42; 463/43
(58) Field of Search ............ 707/1, 104.1; 446/26; 463/36, 37, 38, 39, 40, 41, 42, 43, 44, 45, 46, 47

(56) References Cited

U.S. PATENT DOCUMENTS

| 5,827,179 A | * | 10/1998 | Licther et al. | 128/920 |
| 5,876,351 A | * | 3/1999 | Rohde | 600/509 |
| 5,948,040 A | * | 9/1999 | DeLorme et al. | 340/990 |
| 6,175,857 B1 | * | 1/2001 | Hachiya et al. | 709/206 |
| 6,397,250 B1 | * | 5/2002 | Clarke | 709/225 |

FOREIGN PATENT DOCUMENTS

| WO | WO98/41299 | * | 9/1998 | A63F/9/22 |

OTHER PUBLICATIONS

Official Translation, WO 98/41299, Ralph McElroy Translation Company.*

* cited by examiner

Primary Examiner—Diane D. Mizrahi
Assistant Examiner—Michael Spiegel
(74) Attorney, Agent, or Firm—Gates & Cooper LLP

(57) ABSTRACT

A portable device comprising a processor, an amount of memory, and one or more environmental sensors is carried about the body, and periodically data is recorded from the sensors. When connected to a personal computer or the like, the records on the portable device can be transferred to the personal computer, analyzed, and used by an intelligent agent application, enabling the application to provide the portable device with the information necessary to alert the user when he/she is in a particular place at a particular time.

30 Claims, 7 Drawing Sheets

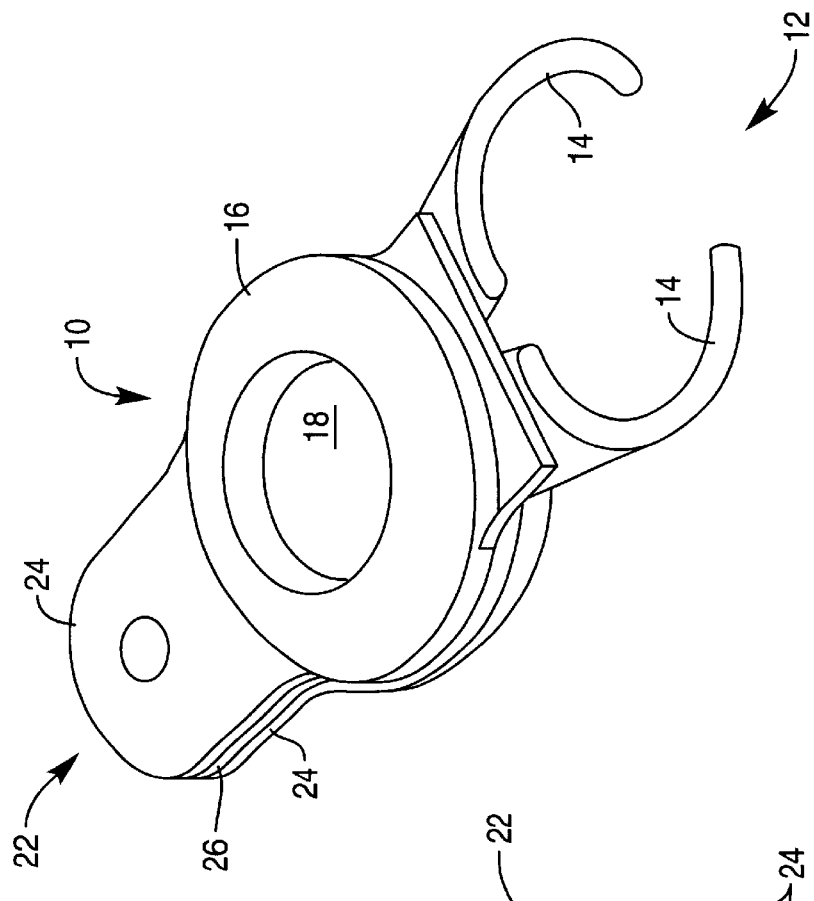
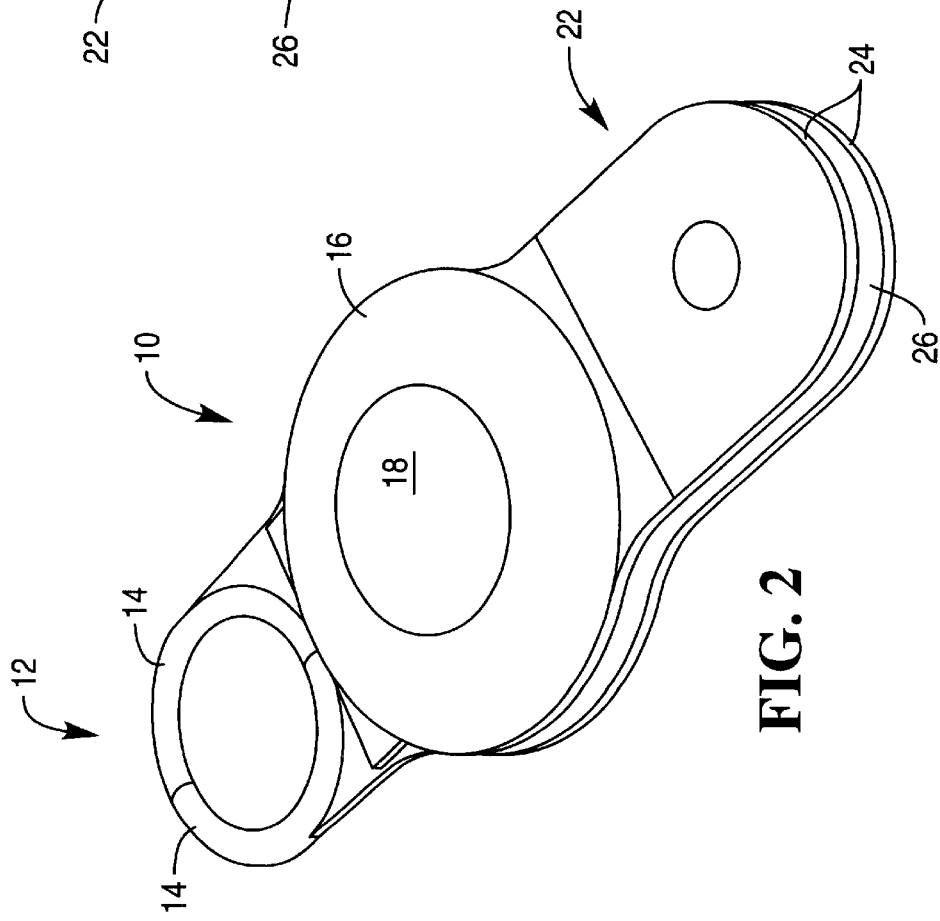

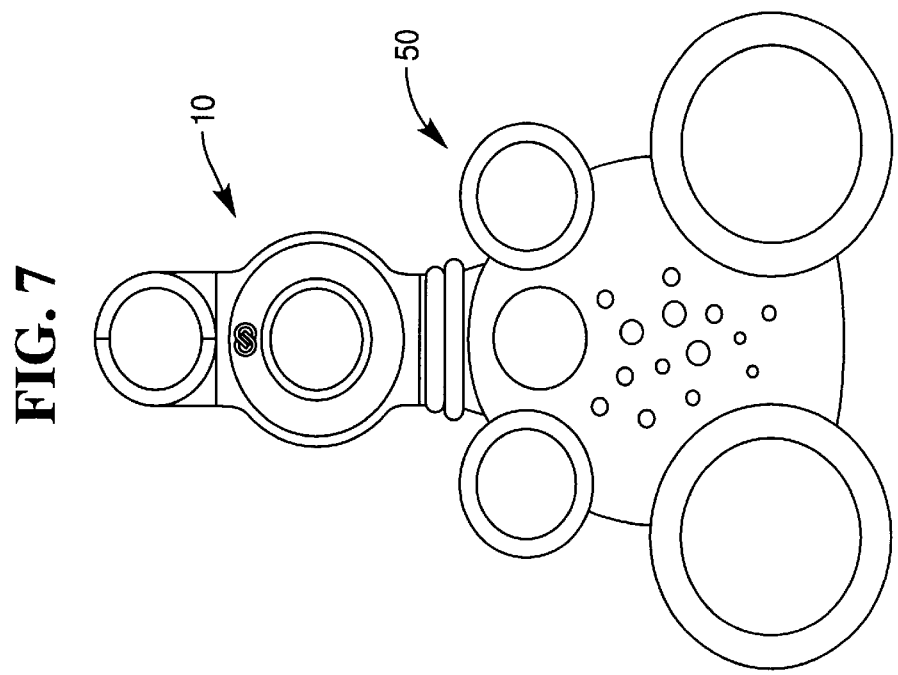
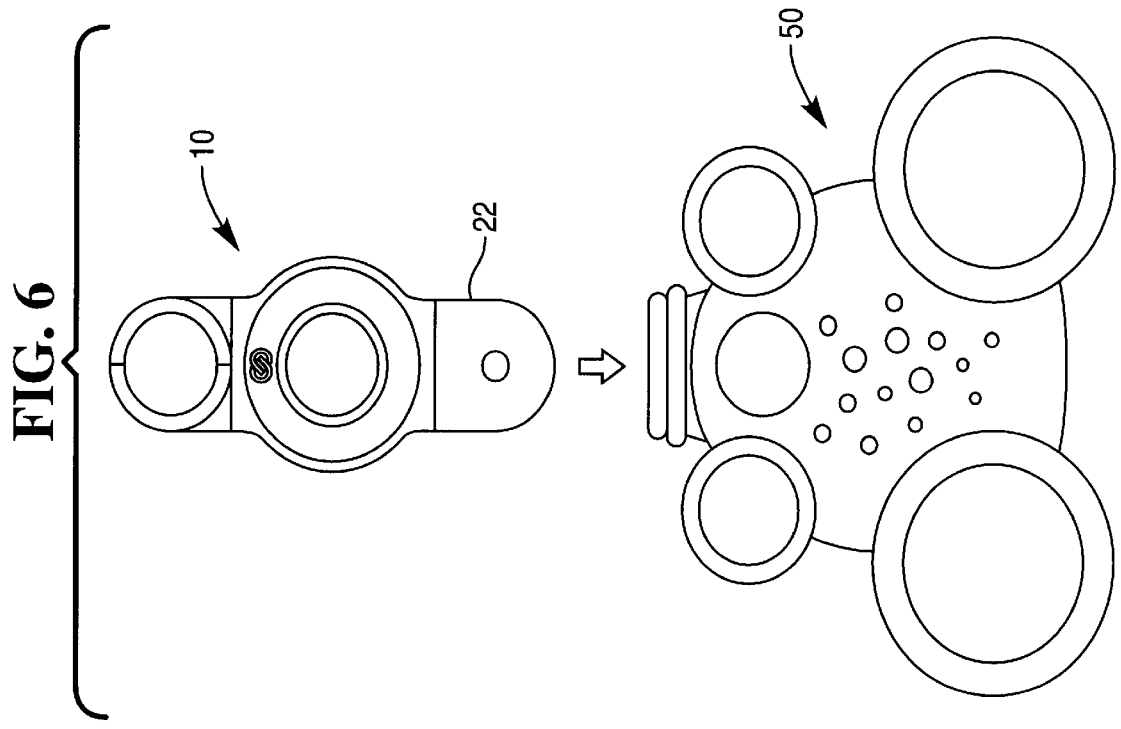

INFORMATION GATHERING AND PERSONALIZATION TECHNIQUES

BACKGROUND OF THE INVENTION

This invention relates to information gathering and personalization techniques. The invention particularly relates to techniques used to perceive a user's needs and circumstances and to tailor to those needs and circumstances information that may be offered to the user, such as IT services offered across a communications network.

The possibilities presented and challenges raised by ever-burgeoning levels of information have led information technology companies to develop 'intelligent agents'. Intelligent agents are software applications that gather data about a user's preferences, habits, and interests, and can then use that data to deliver personalized services to the user. The aim is to ensure that of all the information with which a user could potentially be bombarded, the user is presented only with information deemed to be of most relevance to that user. The user benefits from such tailored information by suffering less irritating distraction, and by learning of information that he or she wishes or needs to know. Of course, the provider of tailored information benefits too, because the user is more likely to buy something that is relevant to his or her needs and aspirations.

At present, intelligent agent systems can only collect data about a user's activities when that person is using a computer. Notably these days, such use will often involve browsing the Internet and interacting with web sites, for example when buying goods or services displayed there, or clicking-through a banner advert on a web page. Even though information technologies are, increasingly, personally owned and portable, this means that a large part of the user's everyday life remains unknown to the agent. The agent is therefore vulnerable to drawing incorrect inferences from the limited data available to it, and so may be unable properly to tailor a service or other information that is presented to the user.

Even if tailored properly, information can only be presented when the user chooses to access it and so, unless fortuitously synchronized with the user's constantly-changing needs and circumstances, this information may lose whatever carefully-tailored relevance it[]once had.

SUMMARY OF THE INVENTION

The invention solves these problems by proposing a portable data capture device that can collect environmental data about a user's whereabouts and upload that data from time to time for use in offering information such as services to the user. The invention extends to a system that interacts with the portable data capture device and to which that device, in more than one sense of the word, is a key. The invention also encompasses related methods, as will be set out more formally below.

The portable data capture device contemplated in preferred embodiments of the invention comprises a processor, an amount of memory, a timekeeping device, and at least one (and preferably several) environmental sensors. Such sensors can take many forms, but could for example include means responsive to temperature, light, humidity, movement, sound or RF signals. The data capture device is carried about the body and so is preferably wearable, for example in the sense of being attachable to the body or to clothing.

While the data capture device is being carried or more preferably worn, environmental data is recorded from the sensors either continuously or periodically. The record thus collected can be described as a plurality of time-series.

When physically or wirelessly connected to a PC, the records on the data capture device can be uploaded to the PC and from there to a network facility accessed through the PC, such as a personal data warehouse. During or after upload, the time-series can be analyzed, for example by cluster analysis. This enables an agent software application eventually to recognize distinct locations that the user regularly visits and events that the user regularly experiences, by identifying approximately correlated values in the record of sensor data.

The user is prompted to name the recognized locations and events, especially by looking back at the time and date and remembering where he or she was then or what he or she was doing, and the locations are added to the vocabulary of the application by correlating them with the sensor data values. The user is then able to instruct the application to alert him or her at a certain time and location. The application interprets this command and stores it in the data capture device.

This way, a unique record tailored to the user is built up and, with further use, refined. Preferably, the user assigns voice keywords to the locations and events.

For example, a software application analyzing sensor data could quite easily infer that there is some meaning in a regular pattern of distinctive noise, movement and humidity most mornings and evenings from Monday to Friday. Recognizing the time, dates and environmental characteristics then prevailing, the user can tell the application that this regular location or event is time spent commuting on an overcrowded train.

The RF sensor optionally included in the data capture device provides the further possibility of recognizing a location directly if that location is equipped with a radio beacon broadcasting within its immediate vicinity. The RF sensor can thus detect the broadcast RF signal when the user nears or enters the relevant location, whereupon that event and its time can be stored for later analysis.

To enable direct recognition from just the broadcast RF signal, that signal may include a code identifying the location, for example a code specific to a particular chain of stores or indeed to a particular one of those stores. Such direct identification could be used to identify the location to the aforementioned software application without further user input being necessary. Otherwise, if the RF signal does not include a code specific as to the precise location but, for example, merely indicates that the user is in a particular town, it can be just one of the sensor inputs used to infer location.

In any event, when the data capture device perceives, to a given degree of approximation, a match between the current state of the sensors and the state previously identified and if necessary named by the user, the device alerts the user by means of vibration, sound and/or light.

The data capture device may also include means to connect to a certain resource on a computer network. In this way, when the data capture device is connected to a PC, the user can instruct the device to deliver a resource to him or her when he or she is in a particular place. In this case, the data capture device will store the command and the address of the resource, such as a URL. When the data capture device alerts the user that he or she is in the place at which the resource is to be delivered, the user can plug the device into another PC at or near to that location, and access the resource upon that other PC for retrieval of information from the resource.

Whilst reference is made above to a PC, it will be evident to those skilled in the art that other computing/communications devices can be used as terminals instead. Such devices are becoming more widespread and promise to continue doing so, as resistance to the PC format is encountered and simpler, more intuitive but no less powerful alternatives come to fruition. For example, existing communications devices such as Internet-enabled mobile telephones, PDAs, ATMs, kiosks and point of sale terminals are contemplated for the purposes of the invention, as are portable screens, digital televisions and set-top boxes, data appliances, desk-top telephones and writing instruments if suitably equipped. The invention can also employ future devices such as so-called street screens, chat booths and retail wands. For convenience, all of these computing/communications devices will be referred to collectively hereinafter as terminals, unless the context demands otherwise.

The invention also resides in a system comprising a portable data capture device adapted to be carried or worn by a user, a terminal connectable to the data capture device for reading data from the device, and a data warehouse accessible from the terminal when the data capture device is connected thereto, the data warehouse containing information specific to the user. When the data capture device is plugged into or otherwise connected to the terminal, the device connects that terminal to the user's data warehouse. This connection enables information from the data warehouse to be passed to the connected terminal and optionally onwards from the terminal to the data capture device. The connection is two-way and so enables data to be passed from the data capture device to the terminal and optionally onwards to the data warehouse.

The invention can be expressed more formally in various ways, for example as a method of obtaining data for use by an agent application in tailoring information presented to a user, the method comprising gathering said data by the user wearing or carrying a personal data capture device that senses environmental data during a period of use. The environmental data thus gathered can be compared with a stored environmental data profile of a particular location or event to determine a match and infer the user's presence at that location or event. A match can be used to alert and remind the user to connect the data capture device to a terminal to download information relating to the location or event.

The invention extends to a data capture system for collecting user activity data, the system comprising: a personal data capture device adapted to be worn or carried about the person of the user during a period of use, the device including a memory and environmental sensor means for supplying environmental data to the memory during the period of use; a terminal adapted for data communication with the data capture device to download environmental data stored in the memory of the device during the period of use; and a data warehouse accessible from the terminal when the data capture device is connected thereto, the data warehouse containing information specific to the user.

The data warehouse is suitably associated with a network resource such as the user's ISP, in which case the data capture device advantageously further includes means for storing in the memory an address of that network resource and the terminal is adapted to locate and load the network resource upon connection of the device to the terminal.

An interface may be launched upon loading the network resource, the interface including means for reading an identifying tag associated with the terminal, means for assessing the user interface capability of the terminal thus identified, and means for configuring the interface to suit the user interface capability of the terminal. This enables numerous different types of terminals to be integrated with the network and used to their best advantage.

Thus, the type of information passed on by the network depends on the type of terminal connected, to which end it is envisaged that all future terminals should have an embedded description tag, and that this tag should include a unique ID, a description of the terminal's abilities, and 3D data describing the device's form. The interface system reads the tag to establish the level of user interface that the terminal is capable of offering, thereby to ensure that the user is presented with the best the terminal has to offer. All system-compatible terminals and data capture devices could be branded with a distinctive logo to distinguish them from non-compatible terminals and data capture devices and so avoid compatibility confusion in the user's eyes.

The interface preferably includes voice interaction means that may embody a virtual personal assistant responsive to the user's voice commands. For example, the virtual personal assistant could have a distinctive name being a voice command for activating the virtual personal assistant. To learn about and respond to the user's activities and needs, the virtual personal assistant is advantageously responsive to data obtained from the data warehouse.

At least one virtual assistant can be associated with a service provider to provide the user with information relating to the services provided by that service provider. Such a virtual assistant suitably tailors the information provided to the user with input from the user's virtual personal assistant.

Conveniently, the data capture device may be programmable through the terminal when the device is connected to the terminal. This enables an application to provide the device with a command and such other information as may be necessary to alert the user when he/she is in a particular place at a particular time.

The system as defined preferably further includes recognition means programmed to recognize from the downloaded environmental data locations visited by the user in the period of use. The recognition means may similarly be programmed to recognize from the downloaded environmental data events experienced by the user in the period of use. In either event, the recognition means is suitably programmed by past environmental data, and designation means may be provided whereby the user can assign names to the recognized locations.

This aspect of the invention extends to the related method of data capture for collecting user activity data, the method comprising: wearing or carrying a personal data capture device about the person of the user during a period of use, the device including a memory and environmental sensor means for supplying environmental data to the memory during the period of use; connecting the data capture device to a terminal for data communication with the data capture device; transferring to the terminal the environmental data stored in the memory of the device during the period of use; and accessing a data warehouse from the terminal when the data capture device is connected thereto, the data warehouse containing information specific to the user.

The environmental data is suitably transferred to the data warehouse via the terminal and is preferably analyzed during or after transfer to the terminal to recognize data locations visited or events experienced by the user in the period of use. That analysis may employ comparison with past environmental data as aforesaid.

The method preferably involves matching by storing in the memory an environmental data profile of a location or an event and comparing with the stored profile environmental data gathered during the period of use. The user can be alerted when a match is perceived between the stored environmental data profile and the environmental data gathered during the period of use.

An invention can also be defined with the data warehouse facility expressed as an optional feature and the recognition means expressed as an essential feature. This results in a data capture system for collecting user activity data, the system comprising: a personal data capture device adapted to be worn or carried about the person of the user during a period of use, the device including a memory and environmental sensor means for supplying environmental data to the memory during the period of use; a terminal adapted for data communication with the data capture device to download environmental data stored in the memory of the device during the period of use; and recognition means programmed to recognize from the downloaded environmental data locations visited or by the user in the period of use. As before, the recognition means can also be programmed to recognize from the downloaded environmental data events experienced by the user in the period of use.

The corresponding method of data capture for collecting user activity data comprises: wearing or carrying a personal data capture device about the person of the user during a period of use, the device including a memory and environmental sensor means for supplying environmental data to the memory during the period of use; connecting the data capture device to a terminal for data communication with the data capture device; transferring to the terminal the environmental data stored in the memory of the device during the period of use; and analyzing the environmental data to recognize locations visited by the user in the period of use.

The elements of these systems and methods also define inventive subject matter. One such aspect involves a personal data capture device adapted to be worn or carried about the person of the user during a period of use, the device including a memory and environmental sensor means for supplying environmental data to the memory during the period of use, the device further including matching means for storing an environmental data profile of a location or event and comparing with the stored profile environmental data gathered during the period of use, to infer the user's presence at that location or event by determining a match.

The device preferably includes alert means for alerting the user when a match is perceived between the stored environmental data profile and the environmental data gathered during the period of use.

Conveniently, attachment means can be provided for attaching the device to the user's clothing, keys or body. The attachment means may, for example, include movable jaws co-operable to define an enclosure when closed.

To include a time element in the stored environmental data, the data capture device advantageously further includes a clock and a processor for correlating and storing time data with the environmental data stored in the memory. It is also beneficial if the device includes means for storing in the memory an address of a network resource. That way, the device can launch a browser or other application to locate the resource as soon as the device has been connected to a terminal. An application address can also be stored to designate the application to be used for this purpose.

The environmental sensor means of the device can include any or all of a humidity sensor, a sound sensor, a motion sensor, an RF sensor, a light sensor, a temperature sensor or a barometric pressure sensor. Where the sensor means consist of or include an RF sensor, the device may be adapted to recognize a location from a coded RF transmission identifying the location.

For optimum accuracy through correlation, the data capture device advantageously employs inputs from a plurality of environmental sensors and the stored environmental data profile includes a plurality of environmental parameters corresponding to a location or event.

The invention also encompasses a method of recognizing a user's presence at a location or an event, the method comprising wearing or carrying an environment-sensing data capture device about the person of a user, the device storing an environmental data profile of a location or event to be recognized, gathering environmental data during a period of use, and comparing that data with the stored profile.

A terminal adapted for use in this method or with the device as defined above includes means for data communication with the data capture device and means for providing a user interface with the data capture device. The terminal can also include means for data communication with a network, the terminal being adapted to locate and load a network resource upon connection of the device to the terminal, and including means for providing a user interface with the network resource.

To encourage the user to carry or wear the data capture device and to connect that device frequently to the user's personal data warehouse for upload of environmental data, the invention also contemplates a data capture system for collecting user activity data, the system comprising: a personal data capture device adapted to be worn or carried about the person of the user during a period of use, the device including a memory and environmental sensor means for supplying environmental data to the memory during the period of use; a terminal adapted for data communication with the data capture device to download environmental data stored in the memory of the device during the period of use; and a data warehouse accessible from the terminal, the data warehouse containing information specific to the user; wherein a personal agent/assistant employing the information in the data warehouse presents a user interface on the terminal, the user interface including a virtual character whose behavior responds to the user's data capture and upload behavior.

This aspect of the invention can also be expressed as a method of data capture for collecting user activity data, the method comprising: wearing or carrying a personal data capture device about the person of the user during a period of use, the device including a memory and environmental sensor means for supplying environmental data to the memory during the period of use; connecting the data capture device to a terminal for data communication with the data capture device; transferring to the terminal the environmental data stored in the memory of the device during the period of use; and accessing a data warehouse from the terminal, the data warehouse containing information specific to the user; wherein a personal agent/assistant employing the information in the data warehouse presents a user interface on the terminal, the user interface including a virtual character whose behavior responds to the user's data capture and upload behavior.

The character preferably represents a creature that may respond to the frequency of data upload by the user. For example, the appearance of the character can respond to the frequency of data upload, the character being relatively nourished in appearance when data upload is relatively frequent and being relatively under-nourished in appearance when data upload is relatively infrequent.

The appearance of the character can respond to other stimuli such as the amount of data uploaded to the data warehouse by the user, the period of time for which the user has been uploading data to the data warehouse, or the number of times the user has accessed the data warehouse via the terminal to upload information to the data warehouse. The character preferably appears to grow and/or mature as more data is uploaded, or as more time elapses since uploads began, or as upload accesses by the user accumulate. Nevertheless, the appearance of the character can be user-selectable and can be transferred or applied to a character representing another user's personal agent/assistant, for example by sending appearance data from one user's data capture device to the other user's data capture device.

Advantageously, the character asks questions of the user and the user's answers enable the personal agent/assistant to understand and categorize the data uploaded to the data warehouse.

Where the invention involves a plurality of a users, the users connecting to their respective data warehouses via respective terminals can be identified for the purposes of enabling communication between users thus identified. A contact list can be stored in a user's data capture device, terminal or data warehouse to alert or connect the user to another user included in that contact list. Simultaneous users can communicate with each other while the users are connected to their respective data warehouses.

Finally, the invention embraces a data capture system for collecting user activity data, the system comprising a personal data capture device as defined above, and a terminal adapted for data communication with the data capture device to download environmental data stored in the memory of the device during the period of use. Further optional features of this data capture system are set out above and in the specific description that now follows.

BRIEF DESCRIPTION OF THE DRAWINGS

In order that this invention can be more readily understood, reference will now be made, by way of example, to the accompanying drawings in which:

FIG. 2 is a perspective view of the data capture device of FIGS. 1(a) to 1(c), taken from one end and with the jaws closed;

FIG. 3 is a perspective view corresponding to FIG. 2 but showing the data capture device from the other end and with the jaws open, a jaw actuating button having been depressed in the manner indicated by the arrow in FIG. 1(b);

FIG. 6 is a front view of the data capture device of FIGS. 1 to 4 being connected to a terminal in the form of a desk telephone;

FIG. 7 is a front view corresponding to FIG. 6 but showing the desk telephone with the data capture device of FIGS. 1 to 4 connected thereto;

DETAILED DESCRIPTION

Figure 1A:
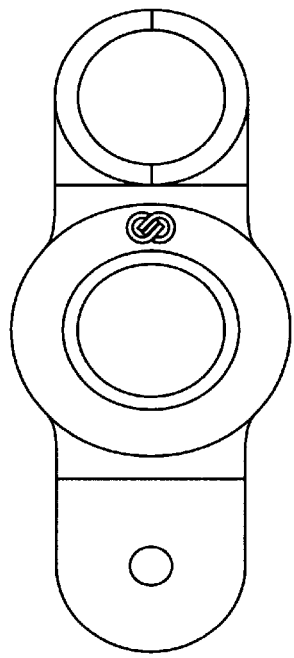
FIGS. 1(a), (b) and (c) are views of a portable data capture device in accordance with the invention, FIG. 1(a) being a plan view with jaws of the device closed, FIG. 1(b) being the corresponding side view, and FIG. 1(c) being a plan view with jaws of the device open.
Figure 1B:
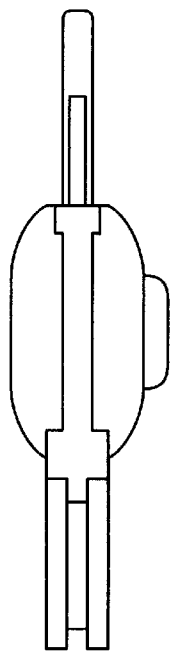
Figure 1C:
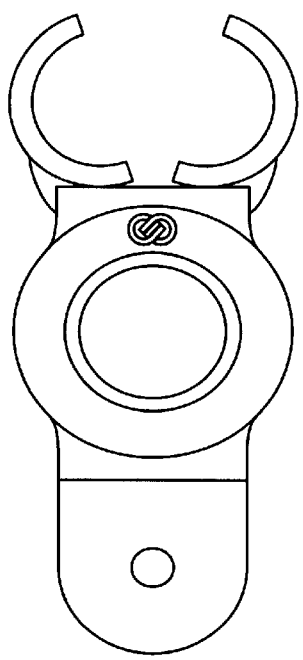

Referring firstly to FIGS. 1 to 4 of the drawings, a data capture device is in the form of a fob 10 suitable for attachment to a user's clothing or key ring. For this purpose, the fob 10 has attachment means 12 including a pair of opposed semi-circular movable jaws 14 at one end of the fob 10 that are hinged to the fob 10 and are biased together into and/or latched in their closed position shown in FIGS. 1(a) and 2. The jaws 14 can be moved apart against this bias or upon unlatching to assume the open position shown in FIGS. 1(c) and 3. To this end, the enlarged central portion 16 of the fob 10 includes a jaw actuation button 18 that, when depressed against spring pressure as shown by the arrow in FIG. 1(b), permits or preferably causes the jaws 14 to open.

Figure 4:
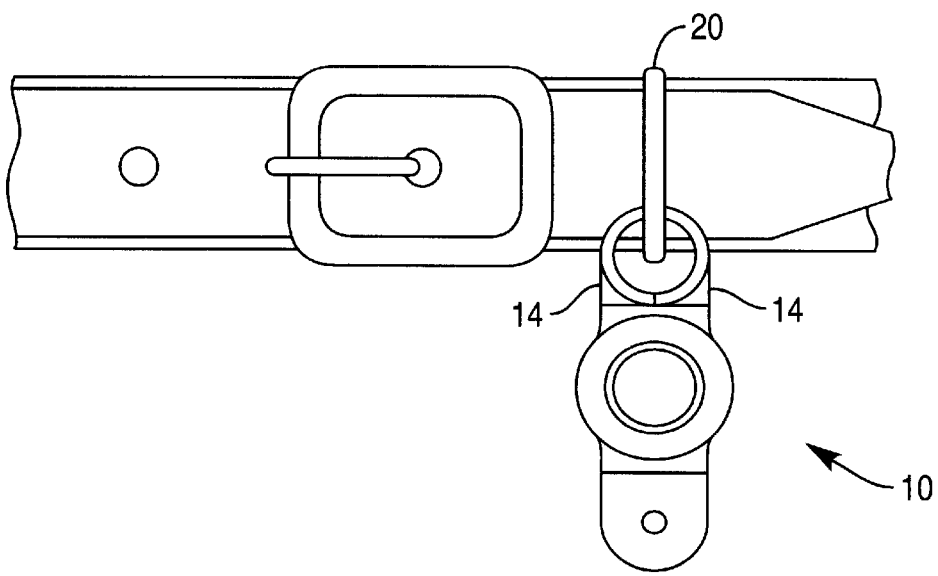
FIG. 4 is a partial front view showing the data capture device of the preceding Figures in use, attached to a convenient part of a user's clothing.

When closed, the jaws 14 define a circular ring that, in use, can encircle part of the user's clothing or key ring as appropriate. By way of example, FIG. 4 shows the jaws 14 closed around a belt loop 20 of a user's trousers or skirt, from which the fob 10 dangles in a conveniently-accessible yet out-of-the way place familiar to those who wear their keys in a similar manner.

A connection means 22 is disposed at the end of the fob 10 opposed to the jaws 14 of the attachment means 12. As will be described, the connection means 22 provides for physical connection between the fob 10 and a terminal equipped with a matching socket. The connection means 22 comprises parallel plates 24 spaced apart to define a peripheral slot 26 giving access to a connector (not shown) defined between and protected by the plates 24. The connector provides for data connection with the terminal, and the shaping of the plates 24 provides for mechanical connection with the socket to retain the fob in the socket as necessary.

All or most of the fob 10 is of molded plastics material, although the jaws 14 could be of metal if deemed necessary for strength.

Figure 5:
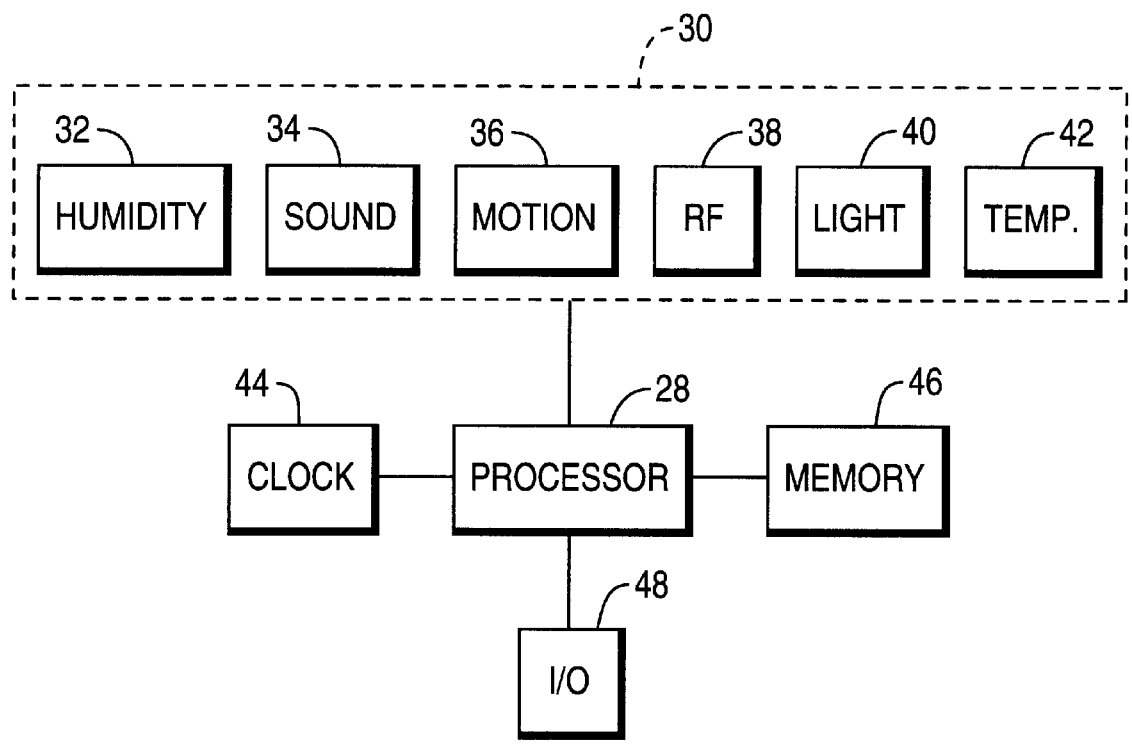
FIG. 5 is a block diagram showing the main internal electronic components of the data capture device of FIGS. 1 to 4.

Referring now also to FIG. 5 of the drawings, the enlarged central portion 16 of the fob 10 is hollow and houses a processor 28 together with a suitable power supply such as a rechargeable battery that could be solar charged. The processor 28 takes inputs from sensor means 30 containing any or all of the following environmental sensors:

a humidity sensor 32;

a sound sensor 34 such as a solid-state microphone;

a motion sensor 36, for example including accelerometer devices;

an RF sensor 38, connected to a suitable antenna (not shown);

a light sensor 40 such as a photocell; and a temperature sensor 42.

Other sensors are possible, such as a barometric pressure sensor to indicate the prevailing weather or the user's elevation above sea level.

Environmental data inputs taken continuously or periodically by the processor 28 from the various sensors 32–42 of the sensor means 30 are processed as may be necessary, for example by decoding and verifying an RF input to filter spurious signals. The data is then time-tagged and possibly also date-tagged by the processor 28 with reference to input from a clock 44 as the tagged data is written by the processor 28 to a memory 46. Again, this data transfer can take place either continuously or periodically. The tagged data is stored in the memory 46 until being uploaded through an I/O port 48 when the fob 10 is connected to a terminal.

The processor 28 and memory 46 are also used to implement location matching means, the memory storing an environmental data profile of a location and the processor comparing environmental data gathered by the sensor means 30 with that stored profile. The stored profile can be downloaded to the memory 46 through the I/O port 48 when the fob 10 is connected to a terminal for environmental data upload. Alert means such as a sounder, light or vibrator as aforementioned (not shown) can be driven by the processor 28 in well-known manner when the processor 28 perceives a match between the stored environmental data profile and the environmental data gathered in current use.

The configuration of the data-handling architecture within the fob 10 is immaterial to the broad concept of the invention, and can be effected in many ways that will be familiar to those skilled in the art. Similarly, the physical layout of the components in relation to the fob 10 and each other is largely a matter of routine design. However, for present purposes, the Inventors currently prefer 'iButton' (trade mark) technology for its advantageous architecture and layout, it being understood that the invention is not limited to the use of such technology.

iButtons are sometimes described as Touch Memory Microcans or Dallas Buttons (both are trade marks) and are available from Dallas Semiconductor Corporation, of Texas, USA. All necessary technical information on iButtons and related technologies is available from Dallas Semiconductor, for example at its web site•HYPERLINK http://www.ibutton.com'•www.ibutton.com•.

As its name suggests, an iButton is a button-shaped device in the form of a small, flat cylinder of stainless steel rather like a watch battery in appearance, if slightly larger. It is approximately 16 mm in diameter and is currently available in two thicknesses, namely 3.1 mm and 5.89 mm. The watch battery analogy also applies to connectivity and I/O: one face of the case constitutes a data electrode whereas the surrounding rim and the other face of the case constitute a ground electrode. The resulting need for just two connections benefits reliability in use and suits the purposes of the present invention by allowing a simple yet effective two-contact connector to be employed within the connection means 22.

The stainless steel case of an iButton seals around and armors electronics within, including a quantity of non-volatile memory and, in some models such as the Java-powered cryptographic iButton, a microprocessor. The quantity and type of memory varies from model to model but currently extends to more than 64 Kbits of RAM in iButtons designed specifically for large storage capacity. Other iButtons contain EEPROM, a real-time clock, a temperature sensor or a transaction counter. It will therefore be appreciated that many of the components outlined in FIG. 5 are available within one or more iButtons, much to the benefit of compactness, cost and robustness.

All iButton variants have a unique factory-set 64-bit registration number, provision for digital identification and information transfer by momentary contact (with, for example, Dallas Semiconductors' 'Blue Dot' (trade mark) receptor cabled to a parallel or serial port of a PC), and the ability to operate standalone or networked using Dallas Semiconductors' '1-Wire' (trade mark) interface. iButtons form a family of components that connect easily into Dallas Semiconductors' MicroLAN (trade mark) local area network architecture. The MicroLAN architecture could be used in this invention, for example to connect sensors: 32–42 of the sensor means 30 to the processor 28, or to provide for data communication between the I/O port 48 and the processor 28. Nevertheless, it is reiterated that other forms of non-volatile memory and other architectures may be used within the broad inventive concept.

Moving on now to FIGS. 6 to 9, these drawings depict some terminals that are compatible with the fob 10. As mentioned previously, there could be many other such terminals. In FIGS. 6 and 7, the terminal is a hands-free desk telephone 50 that has a socket in its top to receive the connection means 22 of a fob 10, which is simply pushed in to the socket to make the necessary connections for data transfer between the fob 10 and the telephone 50. The connection means 22 of the fob 10 also provides the mechanical connection necessary to hold the fob 10 in place within the socket, not that the fob 10 would be likely to drop out of the socket in view of the upwardly-opening orientation of the socket. When connected in this way, the fob 10 causes the telephone 50 to call up the user's ISP in a manner that will be explained in more detail below in relation to the mobile telephone illustrated in FIG. 9.

Figure 8:
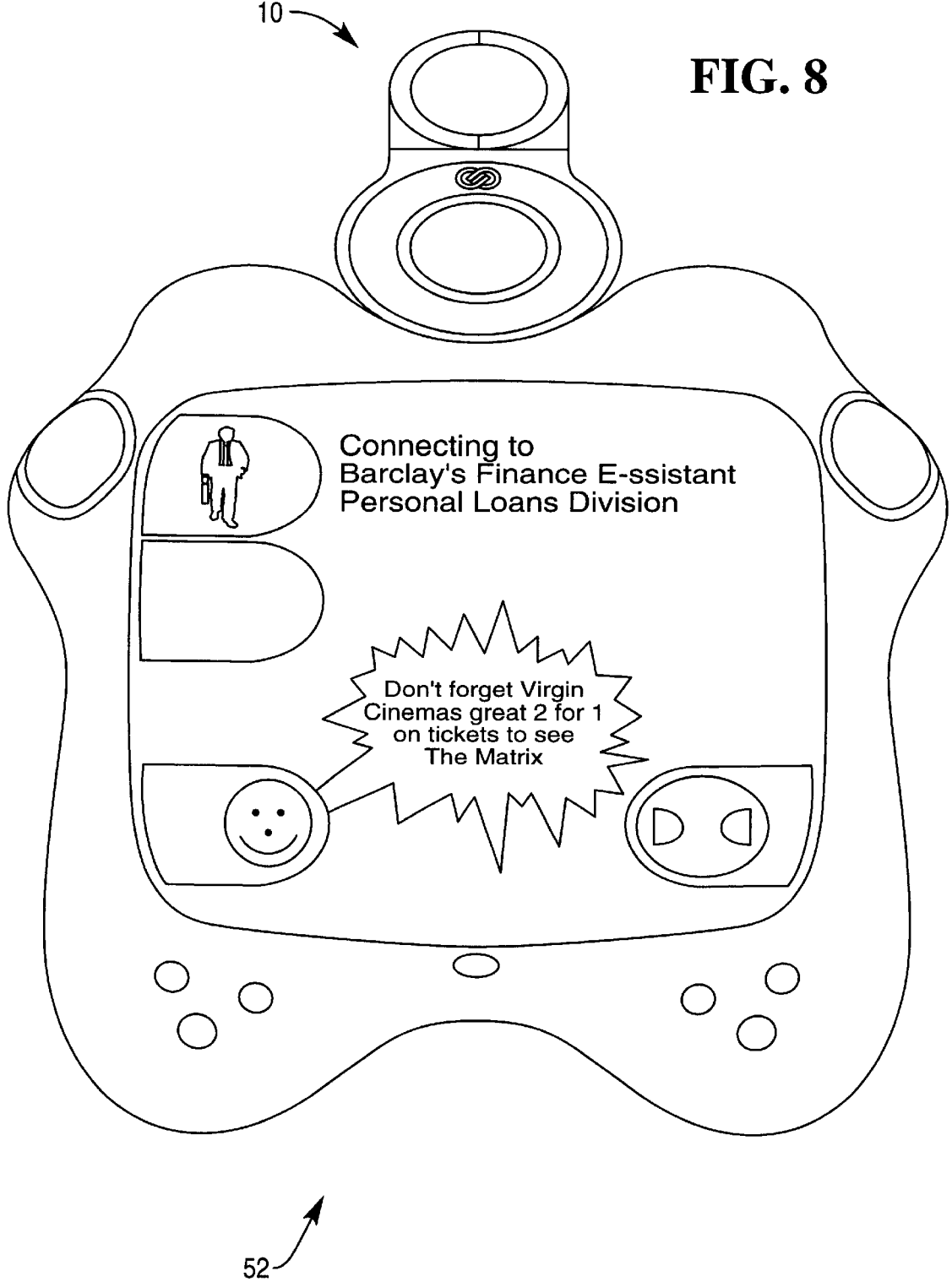
FIG. 8 is a front view of a terminal in the form of a PDA with the data capture device of FIGS. 1 to 4 connected thereto.

FIG. 8 illustrates a hand-held portable terminal in the form of a PDA 52 (personal digital assistant) having a touch screen display. Like the desk telephone 50 of FIGS. 6 and 7, the PDA 52 has a socket in its top edge to receive the connection means 22 of a fob 10, shown already connected in FIG. 8. A further socket can be provided in e.g. the bottom edge of the PDA 52 to permit connection with and mounting of a camera module (not shown). Such a camera module could be used to capture an image of the user's face for use in video telephony, this facility also using speaker and microphone facilities integrated into the PDA 52 or the camera module. Indeed, the user could capture any nearby image in the manner of a digital camera, for subsequent processing, storage and/or transmission via the PDA 52.

Figure 9:
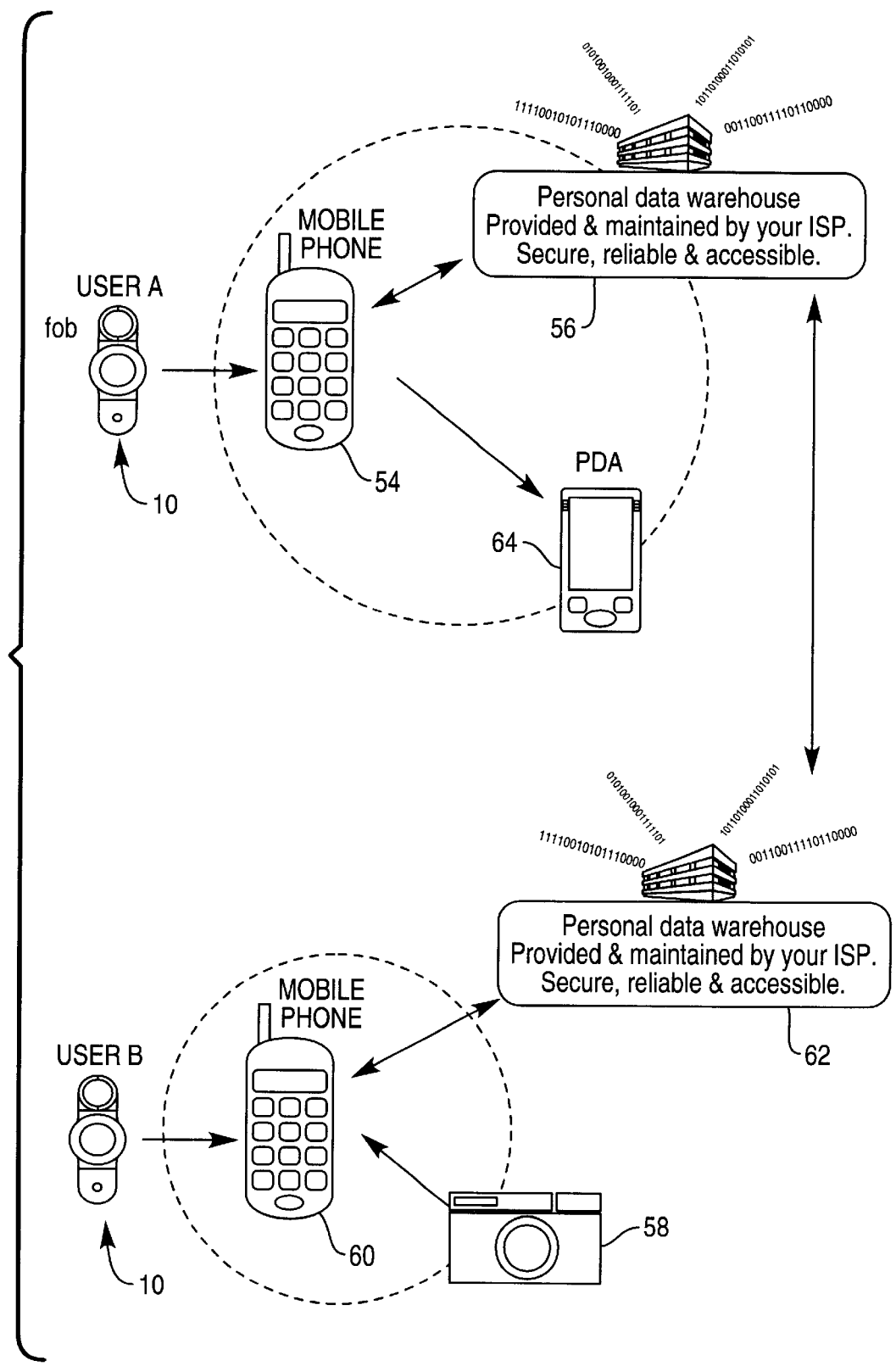
FIG. 9 is a schematic system diagram showing how the invention can be applied to a communications system including mobile telephones.

FIG. 9 illustrates use of the fob 10 with a mobile telephone 54. The telephone 54 is tagged with a description tag whereby the telephone 54 can identify itself and its user interface capabilities to a communications network of which the telephone 54 forms a part. In the example illustrated, the network is administered by the user's ISP. The network also links the user to a personal data warehouse 56, suitably provided and maintained by the user's ISP.

In use by User A, the fob 10 is firstly plugged in to a socket provided in the telephone 54. This causes the telephone 54 to dial and connect to the user's ISP and activates an interface. If previously instructed by the user, the interface can request a security code such as a 4-digit PIN at this stage.

The interface reads the description tag of the telephone 54 to establish the telephone's capabilities in terms of user interface and so on, and formats the presentation of the interface to suit the telephone 54. For example, the interface deduces from the telephone's description tag that the connected device is a telephone with a three-line monochrome dot matrix display and a full numeric keyboard. Using the display of the telephone accordingly, the interface displays various option headings that the user has previously set up and stored at their data warehouse. For example, Option 1 can be a voice dial facility, Option 2 can be a contact list and so on. The user is thus able to use voice dialing to make a call by selecting Option 1, or alternatively the user can opt for Option 2, which involves scrolling through the list of contacts and connecting using the keypad of the telephone 54.

During the conversation thus initiated, another fob user, User B, takes a color photograph with a digital camera 58. Routing the photograph through his or her mobile telephone 60 and personal data warehouse 62, User B sends the photograph to the User A, whereupon the interface informs User A that an image file has arrived and is ready for download. However, the interface has recognized that the display on the telephone 54 is inadequate to show the photograph and informs User A accordingly.

Fortunately, User A is also carrying a PDA 64 with a large color display and so instructs the interface to add the PDA 64 to the network, so that the photograph can then be displayed by and stored on the PDA 64. User A can then instruct the interface to hang up, leaving the telephone 54 on stand-by, or that user can remove the fob 10 from the telephone 54 and become uncontactable by telephone. In that event, messages can be left in the personal data warehouse 56 held by the user's ISP.

An aspect of the configurable interface is a virtual personal assistant or 'E-ssistant' capable of voice interaction with a user. The user can assign voice keywords to various parameters to build a unique E-ssistant that responds to voice commands, and can even give the E-ssistant a distinctive name recognized as a voice command to which the E-ssistant will respond by activating. Hence, for example, using the desk telephone 50, PDA 52 or mobile telephone 54 as a voice terminal for a fob 10, User A can make a telephone call by asking his or her E-ssistant by name to contact the desired recipient of the call, User B. As User B is similarly equipped with an E-ssistant, User B's E-ssistant can initially answer the call and speak to User B to identify the caller and ask if User B wants to take the call. If User B takes the call, conversation begins between User A and User B as normal but if User B does not wish to take the call, User B's E-ssistant can take a message from User A. The message is stored in User B's personal data warehouse 62 for later retrieval.

It is envisaged that, like a human assistant, a user's personal E-ssistant will learn the user's preferences and needs as time goes by and more data is available on the user's purchasing habits and movements. For example, a user's E-ssistant could inform the user of a live web conference in which the user might be interested, because the conference features an author whose books the user has been buying. Alternatively, the E-ssistant could record the event for its user if it knows that the user is out having dinner at the time. The E-ssistant knows about the user's interest in this respect because it monitors purchasing data derived from the user's personal data warehouse or elsewhere.

An E-ssistant could ask for a 'call name' when it recognizes that a user frequently dials the same number, so that the user need only state the 'call name' when he or she wants to dial that number in future. Suitably taught, a user's E-ssistant would also know the best way to contact the user (office, home, mobile phone) and whether the user wants to be contacted at any given time.

Figure 10:
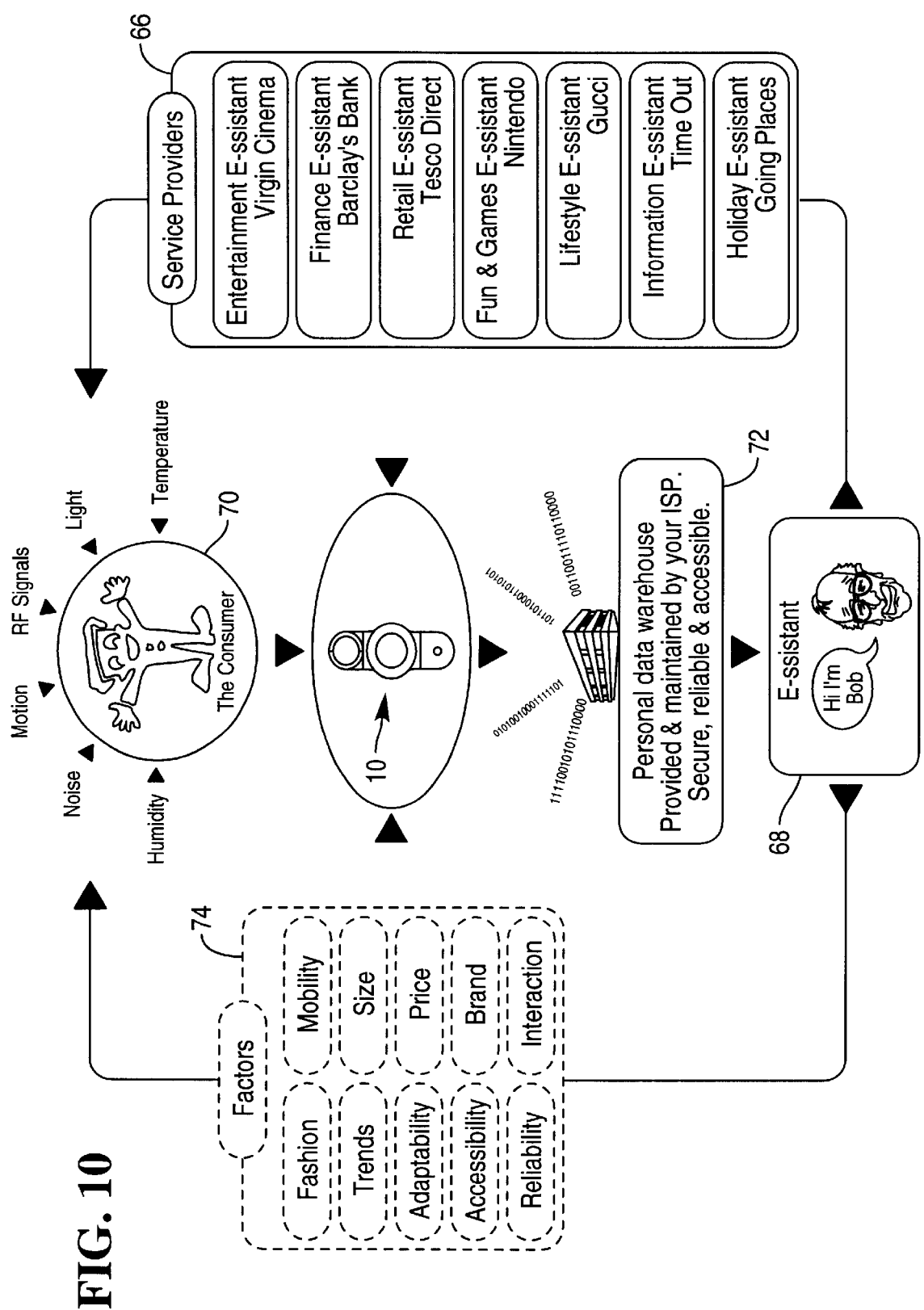
FIG. 10 is a schematic system diagram showing how information flows to and from a user.

FIG. 10 of the drawings introduces the concept of further E-ssistants—'service provider E-ssistants'—associated with designated service providers that each specialize in a particular field of potential interest to the user. Various service provider E-ssistants 66 are listed on the right of the diagram, an example a so-called 'Fun & Games E-ssistant' provided by Nintendo (trade mark), and it will be noted that all of the service provider E-ssistants 66 take a controlling input from the user's personal E-ssistant 68.

The service provider E-ssistants 66 exist to inform the user 70 of the services they represent and are able to tailor that information to the user 70 based on what the user 70 has caused his or her personal E-ssistant 68 to tell the service provider E-ssistants 66. The user 70 can cause his or her E-ssistant 68 to do this either by direct instruction or by example inferred from the user's activities, the E-ssistant 68 taking input for this purpose from the user's personal data warehouse 72 that, in turn, takes input from the user's fob 10 as aforesaid.

The user's personal technology driving factors 74, such as fashion, price and so on, are listed on the left of FIG. 10 and are also influenced by the user's E-ssistant 68 taking input from the user's personal data warehouse 72 to tailor the information presented to the user 70.

In one sense, the invention may be thought of as providing a physical link to a virtual agent or digital assistant and encouraging the growth and development of that agent/assistant. This is achieved by means of various personal data capture devices, which are preferably wearable, and related online services linked to the creation and development of a personal agent/assistant. The Inventors have realized that a particularly effective way to encourage growth and development of a personal agent/assistant is through game play and in this respect, the Inventors perceive an opportunity to offer electronic products and services to the children's or youth market.

So far as the user is concerned, the invention can be embodied as a pack containing data media such as a CD-ROM, a personal data capture device (preferably a Universal Serial Bus (USB) device for optimum future-proof connectivity), and instructions for their use.

The CD-ROM contains the drivers for the USB device so that it can be recognized on a variety of platforms, such as Windows, Play Station II, Mac OS and X-box (all trade marks are acknowledged). The system requirements of such a platform are simply that it is a networked terminal such as a computer/games console with a USB port for connection to the USB device. The terminal can be a mobile networked device.

The USB device is preferably wearable and could, for example, take the form of the aforementioned key fob, a bracelet or a watch. As has been explained, the USB device contains a variety of sensors to detect changes in the user's environment as he or she carries the USB device around, and onboard memory to store this information together with the time the change happened.

In use, it is envisaged that the user wears or carries the USB device everywhere they go and that data concerning the user's changing environment is collected for a period of, for example, 24 hours before a light/sound/vibrate alarm in the USB device notifies the user that the memory of the device is full. Once a suitable driver has been installed on the user's PC/games console platform, simply plugging the USB device into the PC/games console connects the device to the network so that it can upload its data to a personal data warehouse assigned to that user. The memory of the USB device is thereby emptied to the extent that the device is ready to absorb fresh environmental data for a further similar period. The user would continue to collect and upload environmental data in this manner every day, at least for an initial learning period of, for example, two weeks during which the priority is to gather as much information into the user's data warehouse as possible.

For the purposes of game play and appeal to young users, it is envisaged that the user's personal agent/assistant should be given a personality by presenting an animated character image at the user interface, preferably supported by sound to give the character a voice. The character could be modeled on a human but, more preferably, represents a nonhuman creature and need not bear resemblance to any living creature.

In much the same way as a virtual pet such as a Tamagotchi (trade mark) encourages interaction by appealing to the user's caring instinct, the character representing the user's personal agent/assistant encourages the user interaction that is crucial to effective development of the agent/assistant. For example, the data uploaded by the user may be represented by the interface as 'food' to nourish the character, who will otherwise fall ill and maybe die if not regularly 'fed'. This data collection technique is particularly useful during the above-mentioned initial learning period, which may be likened to an incubation or growth period for a virtual creature that is incubating or maturing in the user's data warehouse. During that period, if regularly 'fed', the image of the character can grow, strengthen and mature so as to reward the user's data collection efforts and to encourage such efforts to continue.

After the initial learning period of, for example, two weeks, the emphasis switches from gathering data to understanding and categorizing the gathered data, although some data collection may continue so as to keep the stored data fresh. For example, when the user connects to his or her data warehouse after the initial learning period, the user may find that the maturing creature representing the user's personal agent/assistant asks questions based on patterns emerging in the collected data. The purpose of those questions is to add meaning to the gathered data in terms that the user will understand. For example, in response to prompts from the creature, 'School' could be a keyword assigned to the period of 9:30am to 4:30pm Monday to Friday, with 'Lunch' being the keyword assigned to the period from 12:00 noon to 1:00pm on those days.

Another user, such as another user at 'School' (e.g. another pupil), can also have a personal USB device that, when plugged in to a suitable terminal, connects to another personal data warehouse and another personal agent/assistant whose interface is a different type of creature. It is envisaged that each user would have their own unique creature.

When a USB device is connected to the network via a terminal, the device or the system can detect and identify other USB devices also connected to the network so as to facilitate communication between the users of those devices across the network. For example, contacts may be stored in a user's personal data warehouse and can be categorized by their nature, e.g. 'Friend', and by their name, e.g. 'Dave'. This could open a message/voice window to 'Dave' next time the user uses the network to connect to their warehouse and the system or the USB device senses that 'Dave' is already connected to the network.

'Game' activities are envisaged to provide training scenarios for both the user and the user's personal agent/assistant represented by a creature. For example, the creature could act as a guide to help the user build a home page or personal portal through which the user thereafter accesses the Internet. The user's personal agent/assistant would then be in an ideal position to gain insight into the user's browsing habits and to offer optimal advice tailored by the user's history of hits and search criteria. The creature could also become an in-game character, with which the user can simply enter a game environment and play.

As has been mentioned, the appearance of a character such as a creature can evolve over time. That change can be a function of passing time or as a result of being 'fed' by data upload (or, if the user is remiss, as a result of not being 'fed'). It is also possible for the user to change the appearance of the creature, which appearance can be regarded as a skin or disguise. The skin could be altered by the user, possibly at an on-line 'body shop' where the user is offered the necessary tools to alter the look of his or her creature. Another option is that 'skins' could be collected or exchanged between users of USB devices, either across the, network or by direct transfer from one USB device to another, for example by simply touching two USB devices together at a suitable mutual connection. This would facilitate the collection and exchange methods popular with children's games.

These aspects of the invention all encourage the user to carry or wear the USB device and to connect that device frequently to the user's personal data warehouse for upload of the environmental data, collected by the device when carried or worn, from which the system, and hence the user, will eventually benefit. Over time, therefore, the user's personal agent/assistant represented by a creature or other character becomes more sophisticated and tailored to the user's routine so as to offer context-sensitive information and services.

Many other variations are possible within the inventive concept. For example, the attachment means of the data capture device are optional, albeit preferred, because a user can simply carry the data capture device about the person in a pocket, bag or indeed in the hand. Even where attachment means are provided, the precise form of those means such as the shape and number of the jaws and their method of opening and closing is immaterial to the invention in its broad sense. Similarly, the fob-like shape and character of the data capture device is not, in itself, essential. It would even be possible to embody the invention in an item such as a bracelet that can be attached directly to the wearer's body.

Also, whilst the connection means of the illustrated embodiments relies upon physical connection between the data capture device and a terminal, it would be possible to provide for wireless transmission using well-known IR or RF technology in the data capture device and the terminal. In any event, the form of the connection means can be varied to enable physical connection with any suitable terminal.

In view of these and other variants, reference should be made to the accompanying claims rather than the foregoing specific description in interpreting the scope of the invention.

What is claimed is:

1. A data capture system for collecting user activity data, the system comprising:

a personal data capture device which can be worn or carried about the person of a user during a period of use, the device including a memory and environmental sensor means for supplying environmental data to the memory during the period of use;

a terminal for data communication with the data capture device to upload environmental data stored in the memory of the device during the period of use; and a data warehouse accessible from the terminal, the data warehouse containing information specific to the user, wherein a personal agent/assistant employing the information in the data warehouse presents a user interface on the terminal, the user interface including a virtual character whose behavior responds to the user's data capture behavior in the data capture device and upload behavior to the data warehouse.

2. The system of claim 1, wherein the character represents a creature.

3. The system of claim 1, wherein the character responds to the frequency of data upload by the user.

4. The system of claim 3, wherein the appearance of the character responds to the frequency of data upload, the character being relatively nourished in appearance when data upload is relatively frequent and being relatively undernourished in appearance when data upload is relatively infrequent.

5. The system of claim 1, wherein the appearance of the character responds to the amount of data uploaded to the data warehouse by the user.

6. The system of claim 1, wherein the appearance of the character responds to the period of time for which the user has been uploading data to the data warehouse.

7. The system of claim 1, wherein the appearance of the character responds to the number of times the user has accessed the data warehouse via the terminal to upload information to the data warehouse.

8. The system of claim 7, wherein the character appears to grow and/or mature as more data is uploaded, or as more rime elapses since uploads began, or as upload accesses by the user accumulate.

9. The system of claim 1, wherein the appearance of the character is user-selectable.

10. The system of claim 9, wherein the appearance of the character can be transferred or applied to a character representing another user's personal agent/assistant.

11. The system of claim 10, wherein the appearance of the character can be transferred by sending appearance data from one user's data capture device to the other user's data capture device.

12. The system of claim 1, wherein the character asks questions of the user whose answers enable the personal agent/assistant to understand and categorize the data uploaded to the data warehouse.

13. A data capture system capable of serving a plurality of a users and for collecting user activity data, the system comprising:

a personal data capture device which can be worn or carried about the person of a user during a period of use, the device including a memory and environmental sensor means for supplying environmental data to the memory during the period of use;

a terminal for data communication with the data capture device to upload environmental data stored in the memory of the device during the period of use;

a data warehouse accessible from the terminal, the data warehouse containing information specific to the user, wherein a personal agent/assistant employing the information in the data warehouse presents a user interface on the terminal, the user interface including a virtual character whose behavior responds to the user's data capture behavior in the data capture device and upload behavior to the data warehouse; and means for identifying users connecting to their respective data warehouses via respective terminals and means for enabling communication between users thus identified.

14. The system of claim 13, further comprising means responsive to a contact list stored in a user's data capture device, terminal or data warehouse to alert or connect the user to another user included in that contact list.

15. The system of claim 14, further comprising means for connecting simultaneous users for communication with each other while the users are connected to their respective data warehouses.

16. A method of data capture for collecting user activity data, the method comprising:

wearing or carrying about the person of a user dung a period of use a personal data capture device which includes a memory and an environmental sensor for supplying environmental data to the memory during the period of use;

connecting the data capture device to a terminal for data communication with the data capture device;

transferring to the terminal the environmental data stored in the memory of the device during the period of use;

accessing a data warehouse containing information specific to the user from the terminal; and presenting a user interface on the terminal by using a personal agent/assistant which employs the information in the data warehouse, wherein the user interface includes a virtual character whose behavior responds to the user's data capture behavior in the data capture device and upload behavior to the data warehouse.

17. The method of claim 16, wherein the character represents a creature.

18. The method of claim 16, wherein the character responds to the frequency of data upload by the user.

19. The method of claim 18, wherein the appearance of the character responds to the frequency of data upload, the character being relatively nourished in appearance when data upload is relatively frequent and being relatively undernourished in appearance when data upload is relatively infrequent.

20. The method of claim 16, wherein the appearance of the character responds to the amount of data uploaded to the data warehouse by the user.

21. The method of claim 16, wherein the appearance of the character responds to the period of time for which the user has been uploading data to the data warehouse.

22. The method of claim 16, wherein the appearance of the character responds to the number of times the user has accessed the data warehouse via the terminal to upload information to the data warehouse.

23. The method of claim 22, wherein the character appears to grow and/or mature as more data is uploaded, or as more time elapses since uploads began, or as upload accesses by the user accumulate.

24. The method of claim 16, wherein the appearance of the character is user-selectable.

25. The method of claim 24, wherein the appearance of the character is transferred or applied to a character representing another user's personal agent/assistant.

26. The method of claim 25, wherein the appearance of the character is transferred by sending appearance data from one user's data capture device to the other user's data capture device.

27. The method of claim 16, wherein the character asks questions of the user whose answers enable the personal agent/assistant to understand and categorize the darn uploaded to the data warehouse.

28. A method of data capture involving a plurality of a users and for collecting user activity data, the method comprising:

wearing or carrying about the person of a user during a period of use a personal data capture device which includes a memory and an environmental sensor for supplying environmental data to the memory during the period of use;

connecting the data capture device to a terminal for data communication with the data capture device;

transferring to the terminal the environmental data stored in the memory of the device during the period of use;

accessing a data warehouse containing information specific to the user from the terminal;

presenting a user interface on the terminal by using a personal agent/assistant which employs the information in the data warehouse, wherein the user interface includes a virtual character whose behavior responds to the user's data capture behavior in the data capture device and upload behavior to the data warehouse; and identifying users connecting to their respective data warehouses via respective terminals and enabling communication between users thus identified.

29. The method of claim 28, further comprising:

responding to a contact list stored in a user's data capture device, terminal or data warehouse to alert or connect the user to another user included in that contact list.

30. The method of claim 28, further comprising:

connecting simultaneous users for communication with each other while the users are connected to their respective data warehouses.

* * * * *

UNITED STATES PATENT AND TRADEMARK OFFICE
CERTIFICATE OF CORRECTION

PATENT NO. : 6,539,400 B1
DATED : March 25, 2003
INVENTOR(S) : Bloomfield, M. and Cheyne, T.

It is certified that error appears in the above-identified patent and that said Letters Patent is hereby corrected as shown below:

Column 15,
Line 27, "rime" should be -- time --.

Column 16,
Line 7, after "user" delete "dung" and insert -- during --.

Signed and Sealed this

Twelfth Day of August, 2003

JAMES E. ROGAN
*Director of the United States Patent and Trademark Office*